(12) United States Patent
Nishiuchi et al.

(10) Patent No.: US 6,795,389 B1
(45) Date of Patent: Sep. 21, 2004

(54) OPTICAL INFORMATION RECORDING MEDIUM WITH SUBSTRATE AND MULTIPLE INFORMATION

(75) Inventors: Kenichi Nishiuchi, Osaka (JP); Ken'ichi Nagata, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/786,735

(22) PCT Filed: Sep. 6, 1999

(86) PCT No.: PCT/JP99/04828

§ 371 (c)(1),
(2), (4) Date: Mar. 8, 2001

(87) PCT Pub. No.: WO00/16320

PCT Pub. Date: Mar. 23, 2000

(30) Foreign Application Priority Data

Sep. 10, 1998 (JP) .......................... 10-256543

(51) Int. Cl.$^7$ .............................................. G11B 19/04
(52) U.S. Cl. ................... 369/275.3; 369/47.34; 369/281; 369/286; 710/43; 360/72.2
(58) Field of Search ..................... 369/47.34, 275.3, 369/281, 286; 360/49, 72.2; 710/43

(56) References Cited

U.S. PATENT DOCUMENTS

| | | | | |
|---|---|---|---|---|
| 3,994,016 A | * | 11/1976 | Moghadam | 360/77.02 |
| 5,375,020 A | * | 12/1994 | Aggarwal et al. | 360/75 |
| 5,666,238 A | * | 9/1997 | Igari et al. | 360/77.08 |
| 5,726,969 A | | 3/1998 | Moriya et al. | |
| 6,018,430 A | * | 1/2000 | Ho et al. | 360/48 |
| 6,088,180 A | * | 7/2000 | Lee | 360/63 |
| 6,104,558 A | * | 8/2000 | Greenberg et al. | 360/49 |
| 6,272,565 B1 | * | 8/2001 | Lamberts | 710/43 |
| 6,560,055 B1 | * | 5/2003 | Nemazie et al. | 360/53 |
| 6,567,233 B1 | * | 5/2003 | Chew et al. | 360/77.05 |

FOREIGN PATENT DOCUMENTS

| | | |
|---|---|---|
| JP | 03054727 | 3/1991 |
| JP | 03219440 | 9/1991 |
| JP | 10112066 | 4/1998 |

* cited by examiner

*Primary Examiner*—Gautam R. Patel
(74) *Attorney, Agent, or Firm*—Mechant & Gould P.C.

(57) ABSTRACT

An optical information recording medium is provided with a plurality of information layers (2, 3), each of which has a sector structure in which a data area (8, 12) is divided in the circumferential direction by a sector address (9, 13). The positions of the sector addresses (9, 13) of the respective information layers (2, 3) coincide in the circumferential direction. This can prevent errors during reproduction caused by the effect of other information layers and stabilize recording characteristics, resulting in an increased recording capacity of a rewritable recording medium having a plurality of information layers with a sector structure.

3 Claims, 9 Drawing Sheets

(a)

(b)

(a)

(b)

OPTICAL INFORMATION RECORDING MEDIUM WITH SUBSTRATE AND MULTIPLE INFORMATION

TECHNICAL FIELD

The present invention relates to a recording medium having a multilayer structure in which optically recordable and reproducible information layers are laminated, and to a recording/reproducing method and a manufacturing method for the same.

BACKGROUND ART

Conventionally, optical disks or optical cards are known as optical information recording media on which information can be recorded or reproduced optically. These recording media use a semiconductor laser as a light source, and a great deal of information can be recorded or reproduced by irradiating the recording media with light that is finely focused by a lens.

At present, there is much research on the above recording media to improve their recording capacities. For example, a recording medium having a multilayer structure, where recording capacity is doubled by laminating information layers for recording or reproducing information signals, has been proposed (U.S. Pat. No. 5,726,969). Under such circumstances, read-only DVD-ROM disks including two information layers have been put into practical use.

On the other hand, optical disks that can be recorded in the user's environment have been achieved using a phase changeable material, a magneto-optical recording material, a dye material, or the like. There are two systems for recording signals on such optical disks: a sector-structure system and a continuous recording system. The former is used mainly to record data information, while the latter is used to record sound information, such as CD-Rs.

In the optical disks having a sector structure, an area for managing information to be recorded and a data area on which information signals are recorded by users are separated. However, when the recording system of a sector structure is applied to a multilayer recording medium, reproduced signals are distorted because of the recorded state of adjacent layers.

FIG. 9 shows a cross section of a conventional two-layer disk and an example of reproduced signals from an information layer. In the two-layer disk shown in FIG. 9(a), a first information layer 2 and a second information layer 4 are formed on a substrate 1, and a separating layer 3 is provided between the two information layers. On top of that, a protective substrate 5 is formed.

The first information layer 2 has a sector structure including a data area 8 for recording information signals and a sector address 9 spaced at predetermined intervals along the length of the data area. The sector address 9 is used for management information for recording/reproducing information signals. Similarly, the second information layer 4 also includes a data area 12 and a sector address 13.

In FIG. 9(a), the first information layer 2 is not recorded, whereas signals are recorded on the second information layer 4.

FIG. 9(b) shows reproduced signals from the second information layer 4. In this case, since transmissivity of the first information layer 2 is unchanged, constant signals in accordance with a pattern recorded on the second information layer 4 can be reproduced.

On the other hand, in FIG. 9(c), the first information layer 2 is recorded; FIG. 9(d) shows reproduced signals in such a case. Here, the first information layer 2 has the characteristic in which its transmissivity is increased by recording information. As shown in FIG. 9(d), the reproduced signals from the second information layer 4 have a waveform whose amplitude is increased in the area corresponding to the recording area of the first information layer 2.

As described above, in an optical disk having a sector structure, signals are recorded only on the data area, not on the sector address. Therefore, when information signals are reproduced, the amplitude of reproduced signals and the signal level fluctuate significantly depending on the recorded state of the opposite layer. In particular, when the reproduced signals from the second information layer are demodulated, reproduction errors are caused in the area corresponding to the boundary between the address portion and the data area of the first information layer, so that the recorded information cannot be demodulated correctly.

Similarly, in recording, the amount of light that reaches the second information layer varies depending on the recorded state of the first information layer, so that information does not recorded correctly.

DISCLOSURE OF INVENTION

The present invention is intended to solve the conventional problems described above and has an object of providing an optical information recording medium that can prevent the effect of the recorded state of other information layers and can be reproduced stably regardless of the level fluctuation of reproduced signals, a method for recording/reproducing signals on/from the optical information recording medium, and a method for manufacturing the same.

In order to achieve the above object, a first optical information recording medium of the present invention includes a substrate and at least two information layers formed on the substrate. The information layer is formed of a thin film that shows a change that is optically detectable by irradiation of light beams. A separating layer that is transparent to a wavelength of the light beams is formed between the information layers. Each information layer has a sector structure including a sector address and a data area that are divided in the circumferential direction. The positions of the sector addresses of the respective information layers coincide in the circumferential direction. The optical information recording medium described above can prevent errors during reproduction caused by the effect of other information layers, even in the case of an information recording medium of multilayer recording type with a sector structure, and thus stabilizing its recoding characteristics.

The first optical information recording medium includes a first substrate and a second substrate having a sector structure including a sector address and a data area that are divided in the circumferential direction. A first information layer is formed on the first substrate, and a second information layer opposed to the first information layer is formed on the second substrate. It is preferable that the position of the sector address of the first substrate and the position of the sector address of the second substrate coincide in the circumferential direction. The optical information recording medium described above can prevent errors during reproduction caused by the effect of other information layers, even in the case of an information recording medium of multilayer recording type with a sector structure, and thus stabilize its recording characteristics.

Furthermore, it is preferable that the amount of dislocation between the sector addresses of the respective information layers in the circumferential direction be smaller than the sum of the length of the gap between the sector address and the data area and the length of a guard data in the data area. The amount of dislocation within the above range can ensure the amplitude of reproduced signals of the data signals in the data area.

It is preferable that each information layer further includes a management area, and that a sector position identifier for identifying the position of a sector is located in the area other than the data area, the sector address, and the management area of each information layer so as to have a certain relationship to the sector address of each information layer in the circumferential direction. The optical information recording medium described above can facilitate adjusting the position of each information layer.

It is preferable that the sector position identifier is arranged in proximity to the management area at the inner circumferential region thereof, and that the shape of the sector position identifier formed on the information layer closest to the substrate is different from the shape of the sector position identifier formed on the other information layers. The optical information recording medium described above facilitates adjusting the position of each information layer further because the information layer to which the detected sector position identifier belongs can be distinguished easily.

It is preferable that each of the first and the second substrate further includes a management area, and that a sector position identifier for identifying the position of a sector is located in the area other than the data area, the sector address, and the management area of each of the first and the second substrate so as to have a certain relationship to the sector address of each of the substrates in the circumferential direction. The optical information recording medium described above can facilitate adjusting the position of each information layer.

It is preferable that the sector position identifier be arranged in proximity to the management area at the inner circumferential region thereof, and that the shape of the sector position identifier formed on the first substrate is different from the shape of the sector position identifier formed on the second substrate. The optical information recording medium described above facilitates adjusting the position of each information layer further because the information layer to which the detected sector position identifier belongs can be distinguished easily.

Next, a second optical information recording medium of the present invention includes a substrate and at least two information layers formed on the substrate. The information layer is formed of a thin film that shows a change that is optically detectable by irradiation of light beams. A separating layer that is transparent to a wavelength of the light beams is formed between the information layers. A first information layer, which is one of the information layers, has a sector structure including a sector address and a data area that are divided in the circumferential direction. The information layers other than the first information layer are provided with spiral guide grooves formed on an entire surface of a data area. The optical information recording medium described above does not require adjustment of the position of the sector address of each information layer, so that an optical information recording medium, in which the positions of the sector addresses of the respective information layers coincide in the circumferential direction, can be obtained.

In the second optical information recording medium, it is preferable that a sector address composed of a recording mark formed by irradiation of light beams be provided on the guide grooves of the information layers other than the first information layer so as to be at the same circumferential position as that of the sector address of the first information layer. The optical information recording medium described above allows the signals reproduced from the sector address of each information layer to provide equal quality. In addition, the signals of the address portion of each information layer can be reproduced with the same simple circuit.

It is preferable that the second optical information recording medium includes a first substrate having guide grooves with a sector structure including a sector address and a data area that are divided in the circumferential direction and a second substrate having spiral continuous guide grooves, and that a first information layer is formed on the first substrate and a second information layer opposed to the first information layer is formed on the second substrate. The optical information recording medium described above does not require adjustment of the position of the sector address of each information layer, so that an optical information recording medium, in which the positions of the sector addresses of the respective information layers coincide in the circumferential direction, can be obtained.

Furthermore, it is preferable that a sector address composed of a recording mark formed by irradiation of light beams is provided on the second information layer so as to be at the same circumferential position as that of the sector address of the first substrate. The optical information recording medium described above allows the signals reproduced from the sector address of each information layer to provide equal quality. In addition, the signals of the address portion of each information layer can be reproduced with the same simple circuit.

Next, a third optical information recording medium of the present invention includes a substrate and at least two information layers formed on the substrate. The information layer is formed of a thin film that shows a change that is optically detectable by irradiation of light beams. A separating layer that is transparent to a wavelength of the light beams is formed between the information layers. Each information layer is provided with a data area on guide grooves and a sector address composed of a recording mark formed by irradiation of light beams. The positions of the sector addresses of the respective information layers coincide in the circumferential direction.

Next, a fourth optical information recording medium of the present invention includes a substrate and at least two information layers formed on the substrate. The information layer is formed of a thin film that shows a change that is optically detectable by irradiation of light beams. A separating layer that is transparent to a wavelength of the light beams is formed between the information layers. Each information layer has a sector structure including a sector address and a data area that are divided in the circumferential direction. A recording mark is formed in the recording areas of all the information layers except the information layer most distant from the substrate. The optical information recording medium described above can prevent errors in a recording power suitable for the information layer from occurring.

Next, a first recording/reproducing method for an optical information recording medium of the present invention is a method for recording/reproducing information signals on/from the optical information recording medium using an optical recording/reproducing apparatus. The optical information recording medium includes a substrate, at least two information layers formed on the substrate, and a separating layer formed between the information layers. The information layer is formed of a thin film that shows a change that is optically detectable by irradiation of light beams, and the separating layer is transparent to a wavelength of the light beams. Signals having a predetermined pattern are recorded on the recording areas of all the information layers except the information layer most distant from the substrate when the optical information recording medium is judged to be in the non-recorded state. According to the recording/reproducing method for an optical information recording medium described above, the recording of signals having a predetermined pattern can also serve for the recording to manage faults in an optical recording medium. Thus, the method is suitable for the recording of data information that requires a relatively small data capacity and a large number of files.

In the first recording/reproducing method for an optical information recording medium, it is preferable that the signals having a predetermined pattern are recorded on the information layer closest to the light beams, and then sequentially recorded on the other information layers in the order in which each information layer is positioned with respect to the light beams.

Next, a second recording/reproducing method for an optical information recording medium of the present invention is a method for recording/reproducing information signals on/from the optical information recording medium using an optical recording/reproducing apparatus. The optical information recording medium includes a substrate, at least two information layers formed on the substrate, and a separating layer formed between the information layers. The information layer is formed of a thin film that shows a change that is optically detectable by irradiation of light beams, and the separating layer is transparent to a wavelength of the light beams. Information signals are recorded on the optical information recording medium in such a manner that a first information layer, which is closest to the light beams, is recorded at the beginning, and then a second information layer is recorded after the entire surface of the recording area of the first information layer has been recorded. According to the recording/reproducing method for an optical information recording medium described above, the recording of signals having a predetermined pattern can also serve for the recording to manage faults in an optical recording medium. Thus, the method is suitable for the recording of continuous signals that require a large capacity for a file, such as video signals.

In the second recording/reproducing method for an optical information recording medium, it is preferable that the information signals are recorded on the information layers sequentially in the order in which the information layers are positioned with respect to the light beams.

Next, a first method for manufacturing an optical information recording medium of the present invention includes: a first film forming step of forming a first information layer on a first substrate; a second film forming step of forming a second information layer on a second substrate; a sector position adjusting step of placing the first information layer and the second information layer opposed to each other so that a sector position of the first information layer and a sector position of the second information layer coincide, and a bonding step of bonding the first information layer and the second information layer together using at least a separating layer. The first substrate has guide grooves with a sector structure including a sector address and a data area that are divided in the circumferential direction. The first information layer is formed of a thin film that shows a change that is optically detectable by irradiation of light beams. The second substrate has guide grooves with a sector structure including a sector address and a data area that are divided in the circumferential direction. The second information layer is formed of a thin film that shows a change that is optically detectable by irradiation of light beams. The above manufacturing method can prevent errors during reproduction caused by the effect of other information layers and provide an information recording medium of multilayer recording type with a sector structure that can stabilize recording characteristics.

In the first method for manufacturing an optical information recording medium, it is preferable that the method further includes a hardening step, in which the separating layer is made of a ultraviolet curable resin, the first and the second information layer are bonded together via the layer of ultraviolet curable resin, a sector position is adjusted in the sector position adjusting step before the ultraviolet curable resin is hardened, and irradiation of ultraviolet rays for hardening the ultraviolet curable resin is performed after the adjustment of the sector position has been completed.

Furthermore, in the first method for manufacturing an optical information recording medium, it is preferable that each of the substrates further includes a sector position identifier for identifying the position of a sector, and that the sector position identifier is located in an area other than the data area, the sector address, and a management area so as to have a certain relationship to the guide grooves with a sector structure in the circumferential direction. The position of the sector position identifier is detected in the sector position adjusting step so that the amount of dislocation between the sectors of the respective information layers is adjusted based on a result of the detection. The above method can facilitate adjusting the position of each information layer.

Next, a second method for manufacturing an optical information recording medium of the present invention includes: a first film forming step of forming a first information layer on a first substrate; a sector position adjusting step of placing a stamper and the first information layer opposed to each other so that a sector position of the first information layer and a sector position of the stamper coincide; a bonding step of bonding the first information layer and the stamper together via a separating layer formed of a transparent resin layer and hardening the separating layer; a stripping step of stripping the stamper and the separating layer from the first substrate; a second film forming step of forming a second information layer on the surface of the released separating layer, and a step of protecting an information layer, in which a protective layer or a protective plate is bonded on the most distant information layer from the substrate. The first substrate has guide grooves with a sector structure including a sector address and a data area that are divided in the circumferential direction. The first information layer is formed of a thin film that shows a change that is optically detectable by irradiation of light beams. The stamper has guide grooves with a sector structure including a sector address and a data area that are divided in the circumferential direction. The above method can prevent errors during reproduction caused by the effect of other information layers and provide an information recording medium of multilayer recording type with a sector structure that can stabilize recording characteristics. Thus, the method is suitable for forming three or more information layers.

In the second method for manufacturing an optical information recording medium, it is preferable that three or more information layers are formed on a substrate by repeating the sector position adjusting step, the bonding step, the stripping step, and the second film forming step. The above method allows an arbitrary number of information layers to be laminated.

Furthermore, in the second method for manufacturing an optical information recording medium, it is preferable that the first substrate and the stamper further include a sector position identifier for identifying the position of a sector, and that the sector position identifier is located in an area other than the data area, the sector address, and a management area so as to have a certain relationship to the guide grooves with a sector structure in the circumferential direction. The position of the sector position identifier is detected in the sector position adjusting step so that the amount of dislocation between the sectors of the respective information layers is adjusted based on a result of the detection. The above method can facilitate adjusting the position of each information layer.

BEST MODE FOR CARRYING OUT THE INVENTION

Hereinafter, an embodiment of the present invention will be described with reference to the accompanying drawings.

Embodiment 1

Figure 1:
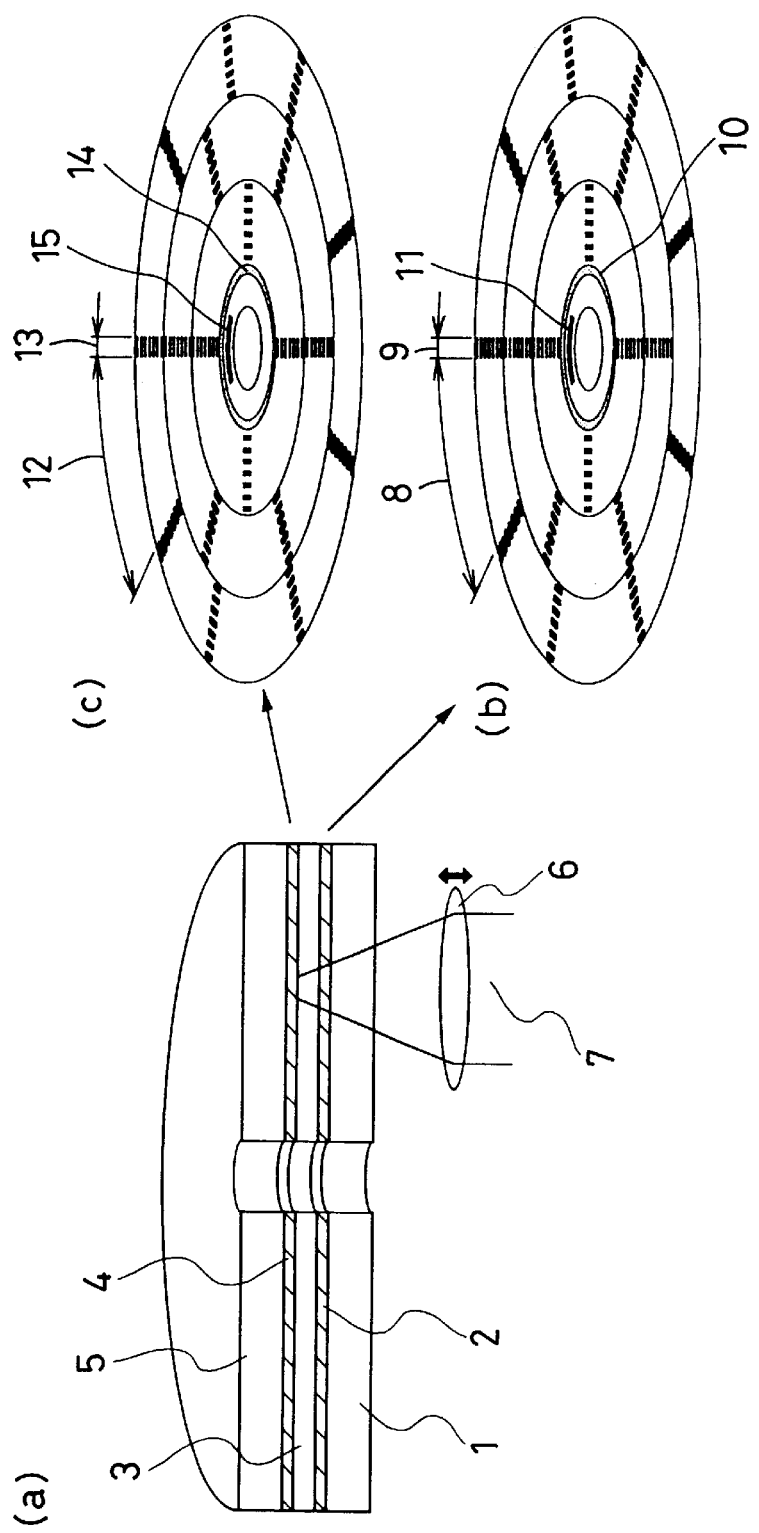
FIG. 1 is a cross-sectional view of an optical information recording medium according to an embodiment of the present invention.

FIG. 1 shows a configuration of an optical information recording medium according to Embodiment 1 of the present invention. FIG. 1(*a*) is a cross-sectional view of the optical information recording medium, in which a first information layer 2 and a second information layer 4 are formed on a substrate 1, and a separating layer 3 is provided between the two information layers. On top of that, a protective plate 5 is formed. Information signals are recorded/reproduced with light beams 7 that are focused by an object lens 6 from the side of the substrate 1, and the light through the first information layer 2 is used for recording/reproducing signals on/from the second information layer 4.

As shown in FIG. 1(*b*), a data area 8 for recording and reproducing information signals and a sector address 9 for managing the position of data to be recorded are provided on the surface of the first information layer 2. The data area 8 includes spiral guide grooves for tracking or sample pits. The sector address 9 includes address pit trains arranged in a pattern corresponding to address information.

Furthermore, a management area 10 where information about the type of recording medium, recording conditions, or the like has been recorded is provided in the inner circumference of the recording medium. A disk identifier 11 for identifying the sector position of the first information layer 2 is provided in the area other than the data area 8, the sector address 9, and the management area 10. The disk identifier 11 is located so as to have a certain relationship to the sector address 9. In this embodiment, the disk identifier 11 is formed in the inner circumference of the management area 10.

As shown in FIG. 1(*c*), the second information layer 4 is provided with a data area 12, a sector address 13, a management area 14, and a disk position identifier 15 that are formed in the same manner as in the first information layer.

The position of the disk position identifier 15 varies depending on the method for identifying the disk position; in this embodiment, it is the same as that in the first information layer 2.

As is apparent from FIGS. 1(*b*) and 1(*c*), the first information layer 2 is identical to the second information layer 4 in the arrangement and the number of sectors. In addition, the positions of the corresponding sectors in the two information layers coincide in the circumferential direction. In other words, the two information layers are arranged so that the sector address 13 of the second information layer 4 is irradiated with the light beams 7 that have passed through the sector address 9 of the first information layer 2.

Figure 2:
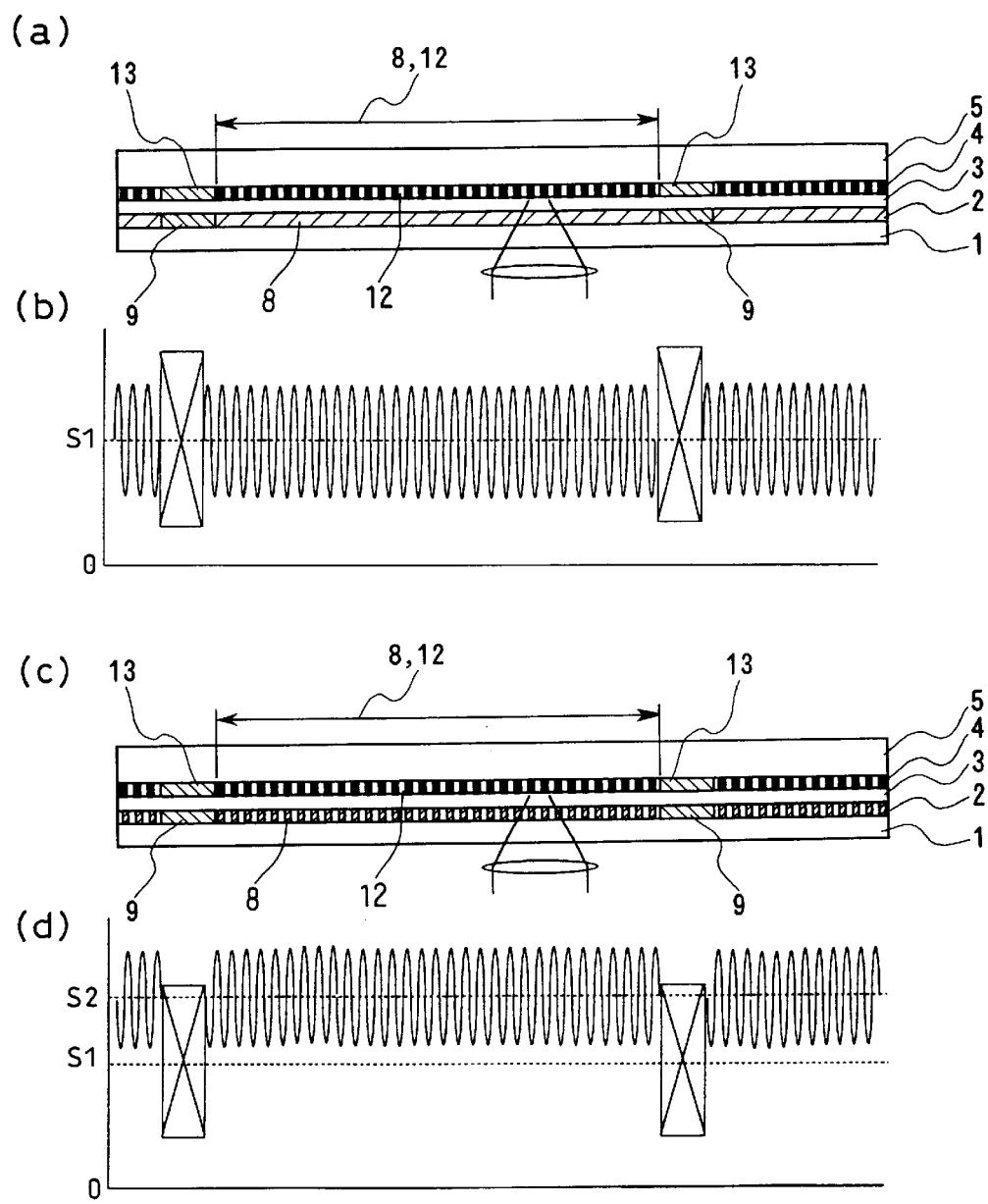
FIG. 2 is a cross-sectional view of an optical information recording medium according to an embodiment of the present invention and a waveform chart of reproduced signals.

FIG. 2 shows the waveform of reproduced signals in the case where the sector positions of the two information layers coincide, as shown in FIG. 1. In FIG. 2(*a*), the first information layer 2 is not recorded and the second information layer 4 is recorded. In FIG. 2(*c*), the first information layer 2 is recorded and the second information layer 4 is recorded.

FIGS. 2(*b*) and 2(*d*) show the amplitude of the reproduced signals from the second information layer 4 and correspond to FIGS. 2(*a*) and 2(*c*), respectively. When the first information layer 2 is not recorded, the reproduced signals are the same as the conventional signals, as shown in FIG. 2(*b*). On the other hand, when the first information layer 2 is recorded, the amplitude of the reproduced signals is increased because of the recorded state of the first information layer 2, as shown in FIG. 2(*d*). However, since the positions of the sector addresses 9, 13 of the respective information layers 2, 4 coincide, the amplitude level of the signals in the data information area is unchanged. As a result, information signals recoded on the second information layer 4 can be demodulated stably.

In order to deal with an increase in the level difference between the address portion and the data portion, the format for a sector structure includes a gap area to be arranged between the data area and the sector address. The gap area where no information is recorded is composed of at least several bits and can compensate for the change in the signal level caused by the recorded state of the first information layer.

Since the form of reproduced signals in the sector address is fundamentally different from that in the data area, a slice level is set individually to the sector address and the data area during demodulation. Thus, such an increase in the level difference between the data portion and the address sector portion does not cause errors during demodulation.

As described above, this embodiment allows information recorded on the second information layer 4 to be reproduced stably regardless of the recorded state of the first information layer 2. Furthermore, this embodiment can also function stably with respect to the effect of the level fluctuation caused by the light reflected from the recorded second information layer 4.

The foregoing described an example of two information layers. However, the same effect can be obtained by a recording medium having three or more information layers, in which the sector positions of the respective information layers coincide.

Figure 3:
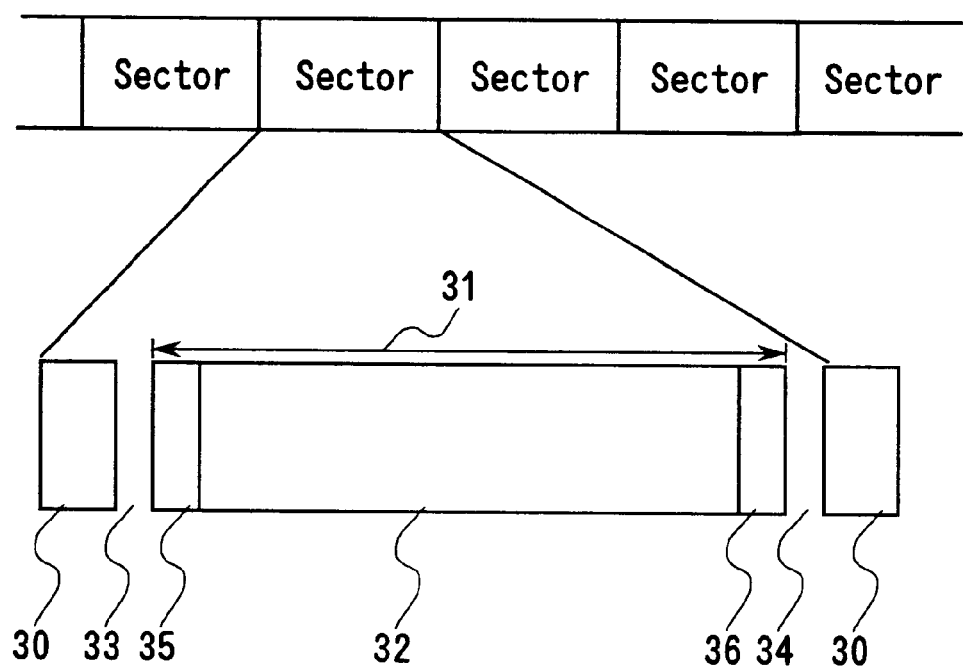
FIG. 3 is a schematic view showing a sector of an optical information recording medium according to an embodiment of the present invention.

Next, the amount of allowance of dislocation of the sectors between the information layers will be described with reference to the schematic view of a sector as shown in FIG. 3. FIG. 2 shows an example of two information layers between which there is no dislocation. However, the dislocation occurs to some extent in manufacturing a recording medium. In FIGS. 1 and 2, a sector includes two areas: a sector address and a data area. However, gap areas 33, 34 are provided between a data area 31 and a sector address 30 to compensate for timing errors of recording caused by rotational fluctuation or the like.

Furthermore, the data area 31 for recording data includes data signals 32 to be reproduced and guard signals 35, 36 that are recorded before and after the data signals 32. The guard signals are used to protect the information layer against degradation because of repetitive recording. Therefore, the amplitude of the reproduced signals in the range of the data signals 32 should be ensured to reproduce the recorded data signals.

Thus, it is preferable that the amount of dislocation between the two information layers, which has no effect on the range of the data signals 32, is not more than the sum of the length of the gap area 33 and that of the guard data area 35, or is not more than the sum of the length of the gap area 34 and that of the guard data area 36.

The foregoing described an example of two information layers. However, the same effect can be obtained by a recording medium having three or more information layers, in which the sector positions of the respective information layers coincide with the same precision.

Figure 4:
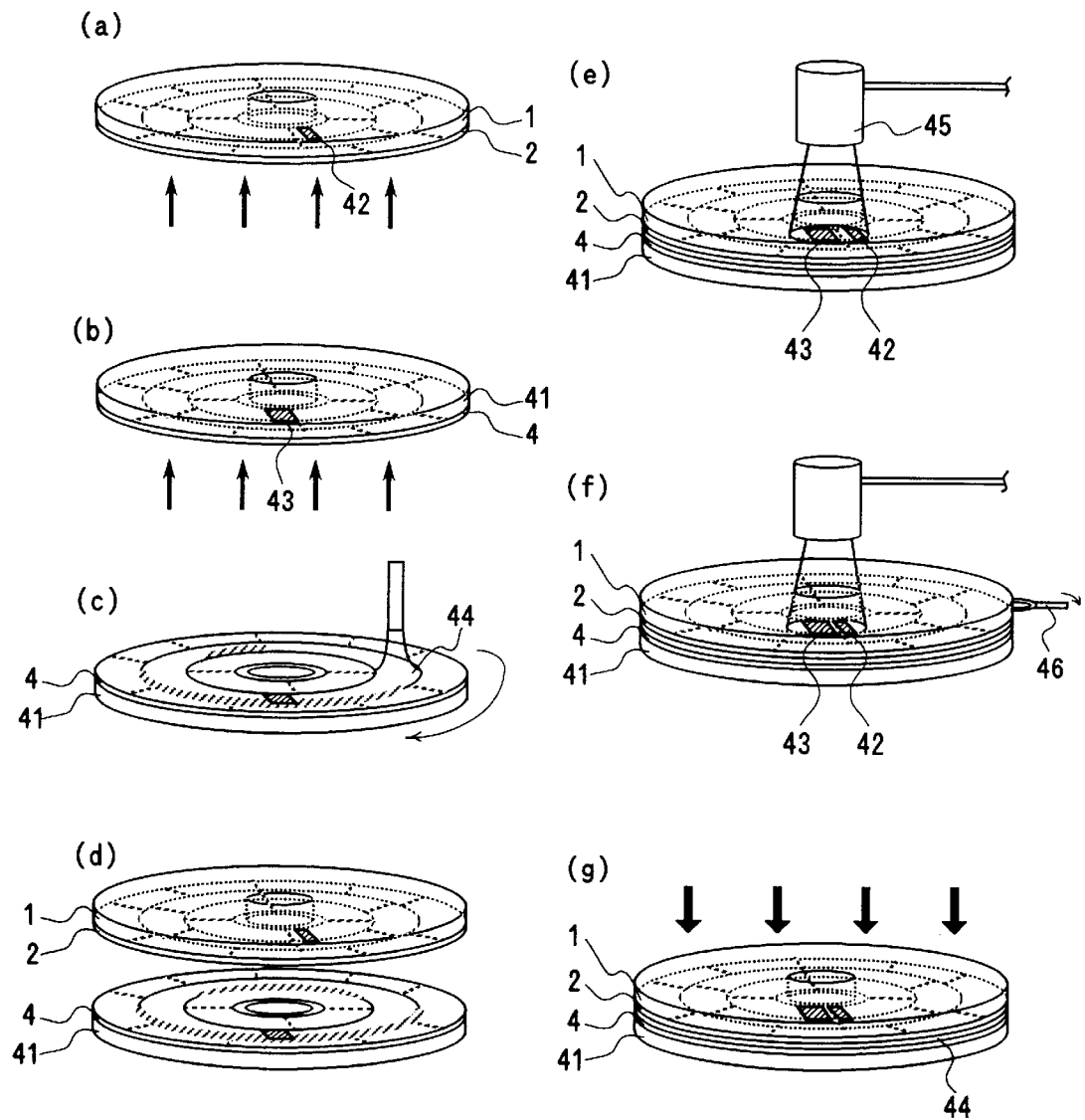
FIG. 4 is a process chart showing a method for manufacturing an optical information recording medium according to an embodiment of the present invention.

Next, a method for manufacturing an optical information recording medium of this embodiment will be described. FIG. 4 shows the process for a first manufacturing method in which the sector positions coincide. FIG. 4(a) shows a first film forming step of forming the first information layer 2 on a first substrate 1 provided with guide grooves having a sector structure. FIG. 4(b) shows a second film forming step of forming the second information layer 4 on a second substrate 41. The second substrate 41 is provided with the same guide grooves as those in the first substrate 1 and acts as a protective plate.

A disk position identifier 42 is provided on the surface of the first substrate 1. The disk position identifier 42 is located in the area other than the data recording area, the sector address, and the management area so as to have a certain relationship to the sector. Similarly, a disk position identifier 43 is provided on the surface of the second substrate 41. These disk position identifiers 42, 43 are formed of guide grooves or pit trains.

FIG. 4(c) shows a coating step of coating the surface of the second information layer 4 with an adhesive 44, which results in an adhesion layer. In this process, an ultraviolet curable resin is used as the adhesive 44. FIG. 4(d) shows a bonding step of bonding the first information layer 2 on the first substrate 1 and the second information layer 4 on the second substrate 41 together via the adhesive 44. The substrates are rotated or pressurized so that the thickness of the adhesive 44 between the substrates 1 and 41 is uniform, if necessary.

FIG. 4(e) shows a position detecting step of detecting the positions of the disk position identifier 42 of the first information layer 2 and the disk position identifier 43 of the second information layer 4 with a photodetector 45 such as a video camera or the like before the adhesive 44 between the information layers 2 and 4 is hardened. Thus, the amount of dislocation between the two disk position identifiers 42 and 43 is determined.

In order to facilitate distinguishing the information layer to which the detected disk position identifier belongs, it is preferable that each of the identifiers of the information layers has different shape or size.

FIG. 4(f) shows a position correcting step of fixing one of the substrates 1, 41 and rotating the other with a rotating unit 46 so that the two disk position identifiers are located to have a certain relationship to each other, i.e., the sector positions of the two information layers coincide. The positional adjustment, such as rotation of the substrate, is completed when the relationship between the two identifiers satisfies certain conditions.

FIG. 4(g) shows a hardening step of hardening the adhesive 44 by irradiation of light of an ultraviolet lamp from the side of the first substrate 1. The process described above can provide a two-layer recording medium in which the sector positions of the two information layers coincide in the circumferential direction.

The disk position identifiers 42, 43 are used for judging the dislocation between the information layers. However, these disk position identifiers can be omitted. In that case, a multilayer disk, in which the sector positions coincide in the circumferential direction, can be obtained in such a manner that the circumferential position is detected with a video camera or the like based on the sector address arrangement in the respective information layers, and then the amount of dislocation is calculated, so that the positions of the two information layers are corrected by the same process as described above.

In FIG. 4, one video camera is used. However, a plurality of video cameras or CCD sensors can be arranged in the circumferential direction of a disk, which increases the positioning speed and accuracy.

The foregoing described the method for adjusting the dislocation only in the circumferential direction. However, it is also effective that the dislocation in the radial direction be corrected after the dislocation in the circumferential direction has been corrected. In other words, first, the amount of dislocation in the circumferential direction is corrected in the step shown in FIG. 4(f). Similarly, the amount of dislocation in the radial direction is determined with a video camera 45 and corrected by moving one of the substrates radially with a disk position adjusting unit 46. This method allows the sector positions in a plurality of the information layers to coincide both circumferentially and radially, so that the effect of dislocation between the information layers is reduced further.

In a recording medium used for two-layer recording, information signals are reproduced by irradiating the two information layers 2, 4 with light and detecting the change in the reflected light. Therefore, the light beams 7 for irradiation must be focused precisely on the information layer from which signals are reproduced. In particular, the first information layer 2 is required to have a certain transmissivity with respect to a wavelength of the light beams 7 so that the light having a predetermined intensity reaches the second information layer 4. In view of the stability of reproduction of signals from the two information layers, it is preferable that the transmissivity of the first information layer be in the range of 30 to 80%.

Furthermore, information is recorded on the second information layer 4 in such a manner that the temperature of the portion irradiated with the light beams 7 at high intensity is raised to change the optical characteristics thereof. Thus, it is necessary that the second information layer satisfies high absorptivity with respect to a wavelength of the light beams 7 as well as a large optical change, i.e., signals in the recorded state are reproduced at high efficiency.

It is preferable that the substrate 1 has a lower optical absorption with respect to a wavelength of the light beams 7 for irradiation, and that concave-convex portions (pits) are formed stably on the surface thereof. Therefore, a resin material such as polycarbonate, polymethyl methacrylate (PMMA), glass material, or the like is used as a substrate material.

The second substrate 41 that acts as a protective plate is not necessarily transparent to the light beams 7. However, it is preferable that the second substrate 41 be formed of the same material as for the first substrate 1 to prevent warping or the like and stabilize its shape.

The second information layer 4 is formed of a recordable and reproducible thin film, whose optical characteristics are changed by absorbing the focused light and the change in the thin film can be detected by the light beams 7. The thin film used for a recording layer that satisfies these requirements includes the following: a phase changeable material in which reflectance is changed as the state of a thin film is changed by irradiation of light, an organic material, such as dyes or the like, in which spectral reflectance is changed, and a photochromic material. Also, some thin films are changed in its shape.

Examples of a phase changeable material include a compound represented by GeSbTe that changes between the amorphous and the crystalline phase, such as a compound based on SbTe, InTe, GeTeSn, SbSe, TeSeSb, SnTeSe, InSe, TeGeSnO, TeGeSnAu, TeGeSnSb, InSbTe, AgInSbTe or the like, an oxide material based on Te—$TeO_2$, Te—$TeO_2$—Au, Te—$TeO_2$—Pd or the like, or a metallic compound that changes between the crystalline and the crystalline phase, such as a metallic compound based on AgZn, InSb or the like.

Examples of an organic dye material include a leuco dye based on triphenylmethane or the like. Examples of a photochromic material include a material based on spiropyran, fulgide, azo or the like.

Recordable information layers are classified into two types according to their functions: write-once type and rewritable type. The former can be recorded only once and the latter allows the recorded information to be rewritten. For the write-once type, only a layer made of a phase changeable material or an organic dye material is formed on a substrate as an information layer. Alternatively, a two-layer structure including a thin film layer for absorbing light and a metal layer can be used to form an alloy by irradiation of light.

It is preferable that the information layer includes a plurality of layers (at least two layers), so that the materials constituting the information layer change reversibly and the optical change in the recorded signals is increased. For example, the two-layer structure may be composed of the following: a dielectric layer and a recording layer, a recording layer and a reflective layer, or a reflective layer and a recording layer. In each structure, the layers are laminated in this order from the light incident side. Furthermore, a three-layer structure may be composed of the following: a dielectric layer, a recording layer, and a dielectric layer or a dielectric layer, a recording layer, and a reflective layer. In each structure, the layers are laminated in this order from the substrate side. In a four-layer structure, e.g., a dielectric layer, a recording layer, a dielectric layer, and a reflective layer may be laminated in this order from the substrate side. There is a five-layer structure in which a first reflective layer, a dielectric layer, a recording layer, a dielectric layer, and a second reflective layer may be laminated. As described above, the recording layer of a thin film and the dielectric layer are formed in contact with each other, so that the degradation of a thin film during repetitive recording can be prevented and the optical change in information recording can be increased.

In order to ensure a sufficient amount of light on the second information layer 4, it is preferable that the separating layer (the adhesive 44) is formed of a material having a lower optical absorption with respect to the wavelength range of the incident light beams 7, in particular, the light through the first information layer 2. Therefore, the separating layer may be formed of a transparent adhesive or, like the substrate, a glass material, a resin material, or the like. When the substrates 1, 41 are formed of a resin material, it is preferable that the same type of resin material is used for the separating layer to provide mechanical reliability after bonding. It is more preferable to use an ultraviolet curable resin because the time required for bonding can be shortened.

The foregoing described the first manufacturing method, in which two information layers are bonded together with a separating layer. Next, a second manufacturing method, in which the guide grooves of a second information layer are formed by a 2P method, will be described with reference to FIG. 5.

Figure 5:
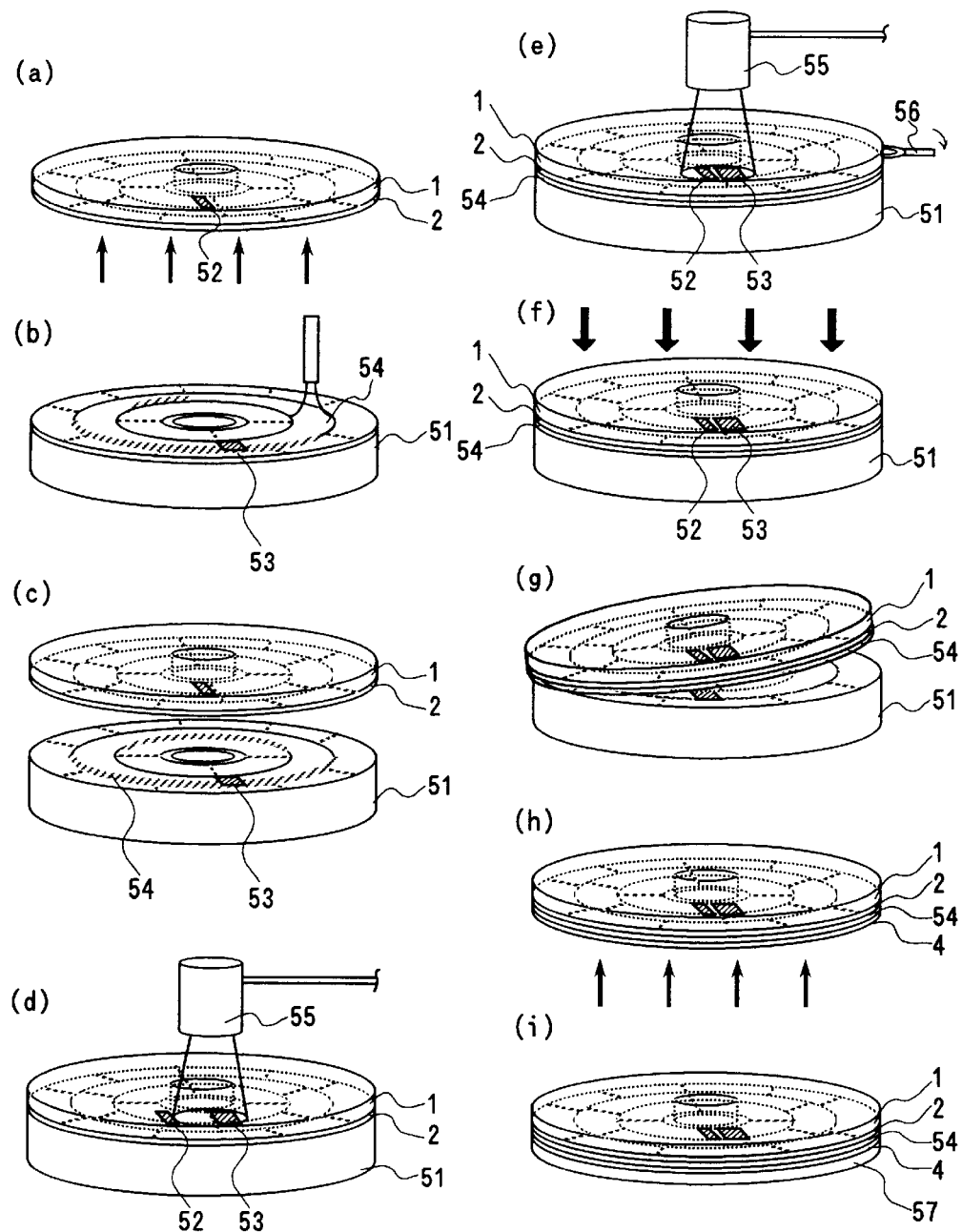
FIG. 5 is a process chart showing a method for manufacturing an optical information recording medium according to another embodiment of the present invention.

FIG. 5(*a*) shows a film forming step of forming a first information layer 2 on a first substrate 1 provided with guide grooves having a sector structure. A disk position identifier 52 is provided on the surface of the first substrate 1. The disk position identifier 52 is located in the area other than a data recording area, a sector address, and a management area so as to have a certain relationship to the sector. FIG. 5(*b*) shows a coating step of coating the surface of a stamper 51 provided with guide grooves having a sector structure with a transparent resin layer 54, which results in a separating layer. As with the first substrate 1, a disk position identifier 53 is provided on the surface of the stamper 51. It is preferable that the disk position identifier 53 of the stamper 51 be different from the disk position identifier 52 of the substrate 1 in shape or size so as to facilitate distinguishing the layer to which the identifier belongs when the disk position is detected.

FIG. 5(*c*) shows a bonding step of bonding the substrate 1, on which the first information layer 2 opposed to the stamper 51 is formed, and the stamper 51 together via the transparent resin layer 54. At this time, the transparent resin layer 54 is diffused by pressure or rotation so as to be uniform between the substrate 1 and the stamper 51.

FIG. 5(d) shows a position detecting step of detecting the positions of the disk position identifier 52 of the first information layer 2 and the disk position identifier 53 of the stamper 51 with a photodetector such as a video camera 55 or the like before the transparent resin layer 54 between the information layers is hardened. Thus, the amount of dislocation between the two identifiers is determined.

FIG. 5(e) shows a position correcting step of fixing one of the substrate 1 and the stamper 51 and rotating the other with a disk position adjusting unit 56 so that the two identifiers 52, 53 are located to have a certain relationship to each other, i.e., the sector positions of the two information layers coincide. The positional adjustment of the substrate is completed when the relationship between the two identifiers 52 and 53 satisfies certain conditions.

FIG. 5(f) shows a hardening step of hardening the transparent resin layer 54 by irradiation of light of an ultraviolet lamp from the side of the substrate 1. FIG. 5(g) shows a stripping step of stripping the substrate 1 at the boundary between the stamper 51 and the transparent resin layer 54.

FIG. 5(h) shows a second film forming step of forming a second information layer 4 on the separating layer formed of the transparent resin layer 54. FIG. 5(i) shows a second coating step of coating the surface of the second information layer 4 with a protective layer 57, and thus a two-layer disk can be provided.

The use of this method allows many more information layers to be laminated. Specifically, after the steps shown in FIG. 5(a) to 5(h), the surface of a stamper provided with an address format corresponding to a third layer is coated again with an ultraviolet curable resin in the step shown in FIG. 5(b).

A disk position identifier of the stamper corresponding to the third information layer may be different from that of the first substrate 1 at least in shape. Alternatively, it may be the same as that of the stamper corresponding to the second information layer.

Next, in the step shown in FIG. 5(c), the stamper is bonded to the substrate on which two information layers have been formed, and then subjected to the steps shown in FIG. 5(d) to 5(h), resulting in a three-layer disk.

When a plurality of information layers are laminated further, the steps shown in FIG. 5(b) to 5(h) are repeated, and thus any number of information layers can be laminated.

The disk position identifiers 52, 53 are used for judging the dislocation between the information layers. However, these disk position identifiers can be omitted. In that case, a multilayer disk, in which the sector positions coincide in the circumferential direction, can be obtained in such a manner that the circumferential position is detected with a video camera or the like based on the sector address arrangement in the respective information layers, and then the amount of dislocation is calculated, so that the positions of the two information layers are corrected by the same process as described above.

In FIG. 5, one video camera is used. However, a plurality of video cameras or CCD sensors can be arranged in the circumferential direction of a disk, which increases the positioning accuracy.

The foregoing described the method for adjusting the dislocation in the circumferential direction. However, it is also effective that the dislocation in the radial direction be corrected after the dislocation in the circumferential direction has been corrected. In other words, first, the amount of dislocation in the circumferential direction is corrected in the step shown in FIG. 5(e). Similarly, the amount of dislocation in the radial direction is determined with the video camera 55 and corrected with the disk position adjusting unit 56. This method allows the sector positions in a plurality of information layers to coincide both circumferentially and radially, so that the effect of dislocation between the information layers is reduced further.

Embodiment 2

Embodiment 2 relates to a second method, in which the sector positions in a plurality of information layers coincide, and to a method for recording a sector address after a recording medium has been formed.

In this embodiment, the overall configuration of an optical recording medium is the same as that shown in FIG. 1(a). FIG. 6(a) shows the structure of a first information layer 2 on which guide grooves for recording data and a sector address composed of pit trains are formed. FIG. 6(b) shows the structure of a second information layer 4, on the entire surface of which spiral guide grooves 61 (illustrated partly) equal to a data area 8 of the first information layer 2 are formed.

Furthermore, when a recording medium having a plurality of information layers is provided, the same layers as the second information layer shown in FIG. 6(b) are formed sequentially, so that any number of information layers can be obtained.

Figure 6:
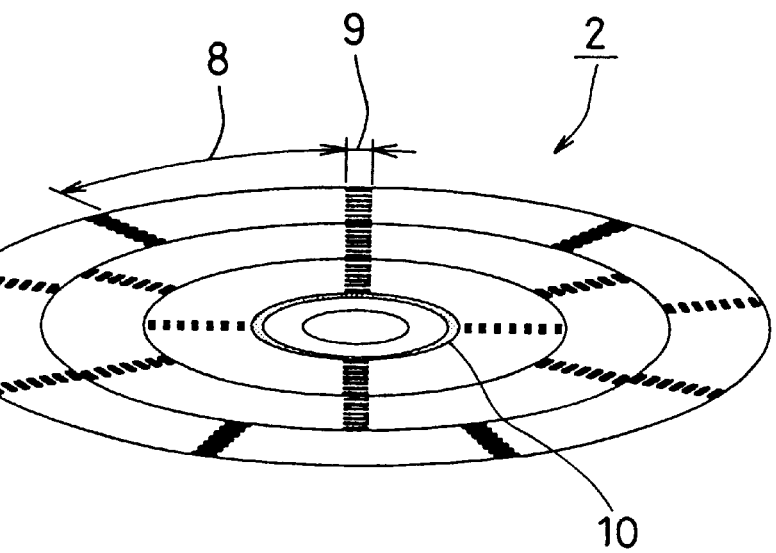
FIG. 6 is a schematic view showing an optical information recording medium according to another embodiment of the present invention.
Figure 6:
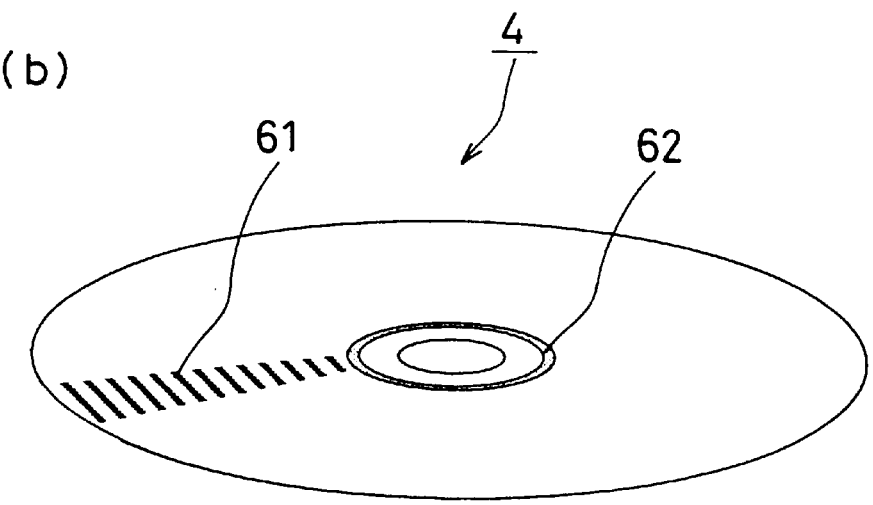

Next, a method for forming a sector address on the second information layer 4 will be described with reference to FIG. 7. A multilayer recording medium 70 having the information layers shown in FIG. 6 is rotated by a disk motor 71 so that signals are reproduced by an optical pickup 72. The reproduction of signals is performed in such a manner that a semiconductor laser 74 in the optical pickup 72 is modulated by a laser driving circuit 73 so as to emit light beams from the optical pickup 72, with which the optical disk 70 is irradiated.

The light beams reflected by the optical recording medium 70 enter the optical pickup 72 again. The incident light beams are converted photoelectrically by a photodetector 75 and amplified by a preamplifier 76 in a reproduction circuit so as to be sent to a control system 77 and a signal reproduction system 78. The control system 77 controls the position of light beams; the signal reproduction system 78 demodulates signals. The light beams are focused on the information layer by a focus control circuit 79 in the control system 77, and the focused light beams are moved to the intended information layer by a focus jump circuit 80.

Next, tracking of the guide tracks on the information layer is performed by a tracking control circuit 81, and the intended track can be scanned by a tracking jump circuit 82.

In the signal reproduction system 78, information signals are provided by demodulating the output of the preamplifier 76 with a demodulation circuit 83. The information signals thus demodulated are sent to a system control section 84, where the information signals are converted into data information, and are then output to an external control device. An address demodulation circuit 85 demodulates the address of the track for reproduction. A layer identification circuit 86 identifies information about layers recorded on a management area of the optical recording medium and specifies the information layer that is being reproduced.

Using an apparatus having the above-described configuration, first, the first information layer 2 in the multilayer optical recording medium 70, including a sector address is irradiated with light beams. Then, address signals formed on the first information layer 2 are reproduced, so that the position of the sector address of the first information layer 2 is specified by the reproduced signals.

In this case, the position of the sector address is based on the relative time interval between address gate signals and rotation synchronizing signals. The address gate signals indicate a period of time required for demodulation by the address demodulation circuit 85, while the rotation synchronizing signals are detected by a rotation synchronous circuit 87 based on the output pulses from the disk motor 71. Those pulses correspond to the position of rotation. A dislocation detector 88 calculates an address delay time d, by which sector address signals are delayed with respect to reference pulses that are supplied once for every rotation by the rotation synchronous circuit 87.

Next, the focus jump circuit 80 scans the guide grooves 61 on the second information layer 4, and an address gate generator 89 generates address gate signals in such timing that the address gate signals are delayed by the address delay time d with respect to the reference pulses from the rotation synchronous circuit 87.

A format circuit 90 supplies address information at the timing corresponding to the address gate signals, and the laser driving circuit 73 modulates the output power of the semiconductor laser 74. Thus, the address signals are recorded on the second information layer 4 in the multilayer optical recording medium 70.

The above method allows the positions of the sector addresses of the first information layer 2 and the second information layer 4 to coincide. Therefore, the amplitude fluctuation of data signals of the second information layer 4 can be suppressed according to the signals recorded on the first information layer 2. Furthermore, the process for adjusting the address positions of the two information layers, which is carried out in Embodiment 1, can be omitted.

There are two types in the above optical recording medium depending on when a sector address is formed. In a first type, address information is recorded during manufacturing. An optical recording medium of this type includes information layers, each of which is provided with address information at the time of shipment. Thus, users can record/reproduce signals on the optical recording medium immediately after they have installed it in a recording/reproducing apparatus.

In a second type, a completed optical recording medium includes information layers on which only guide grooves without a sector address are formed. In this type, users have to record address information on those information layers, which have no sector address. However, since a process for recording address information during manufacturing can be omitted, the production cost of an optical recording medium can be reduced.

The foregoing described an example of two information layers. However, multi-layered information layers can be obtained by forming new information layers on the second information layer; the new information layers have the same structure as the second information layer, in which guide grooves without a sector address are provided.

Figure 8:
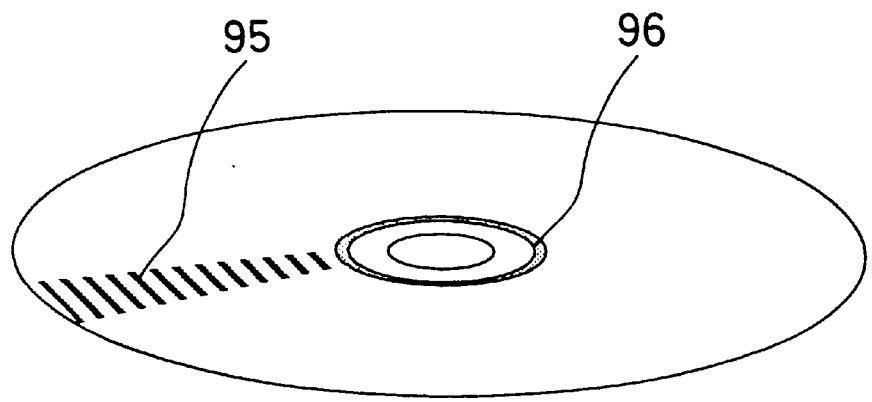
FIG. 8 is a schematic view showing an optical information recording medium according to another embodiment of the present invention.
Figure 8:
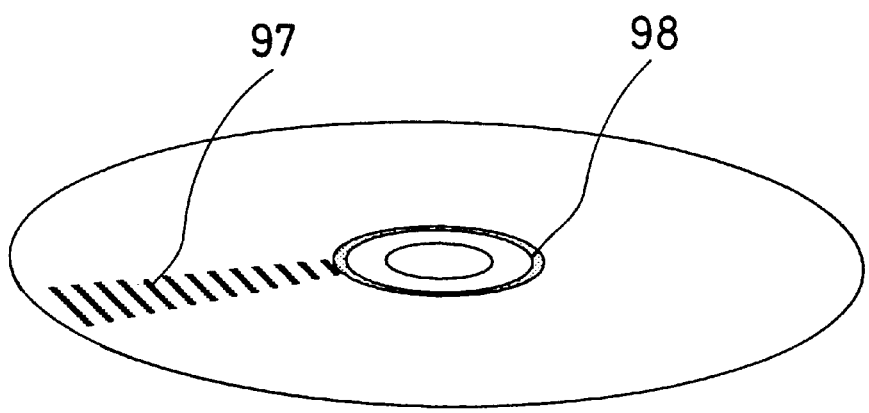

Furthermore, the foregoing described the first information layer on which a sector address has been formed previously. However, as shown in FIG. 8, both the first information layer (FIG. 8(a)) and the second information layer (FIG. 8(b)) may be formed of the guide grooves 95, 97 (illustrated partly) without a sector address, respectively.

Figure 7:
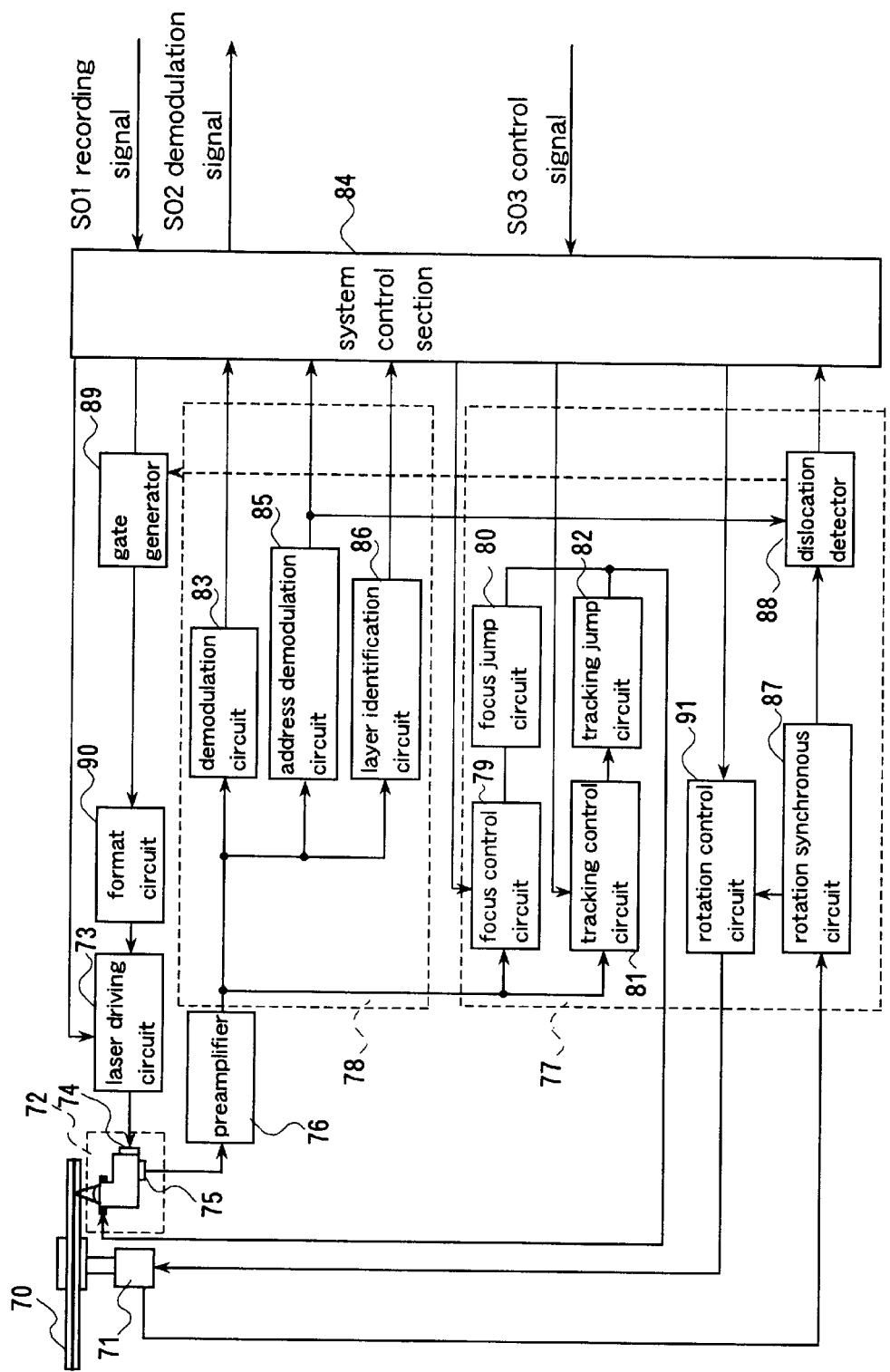
FIG. 7 is a schematic view showing a recording apparatus according to an embodiment of the present invention.

In this case, the recording apparatus shown in FIG. 7 can be applied to the two layers. Specifically, the address gate generator 89 is driven with the same timing as the rotation synchronous circuit so that an address is recorded on the two information layers at this timing. This can provide an optical recording medium, in which the positions of address signals of the respective information layers coincide.

For an optical recording medium including multi-layered information layers, every information layer is formed of guide grooves without a sector address. Recording address signals sequentially on the optical recording medium thus obtained with the recording/reproducing apparatus shown in FIG. 7 can provide a multilayer optical recording medium, in which the positions of address signals of the respective information layers coincide.

As described above, an optical recording medium having information layers, on each of which address information is recorded with laser light, allows the signals reproduced from the sector address of each information layer to provide equal quality. In addition, the signals of the address portion of each information layer can be reproduced with the same simple circuit.

As a method for recording a sector address on every information layer, like the above optical recording medium, there are two types depending on when the sector address is formed. In a first type, address information is recorded during manufacturing. An optical recording medium of this type includes information layers, each of which is provided with address information at the time of shipment. Thus, users can record/reproduce signals on the optical recording medium immediately after they have installed it in a recording/reproducing apparatus.

In a second type, a completed optical recording medium includes information layers on which only guide grooves without a sector address are formed. In this type, users have to record address information on those information layers, which have no sector address. However, since a process for recording address information during manufacturing can be omitted, the production cost of an optical recording medium can be reduced. In this case, the length of a sector, an address code, or the like can be set arbitrarily in accordance with the type of information to be recorded by users and the required capacity.

Embodiment 3

Each of the above embodiments relates to a method for suppressing amplitude fluctuation during reproduction. This embodiment achieves stable recording and reproduction, including signal recording, by further reducing the effect of fluctuation factors among information layers.

Figure 9:
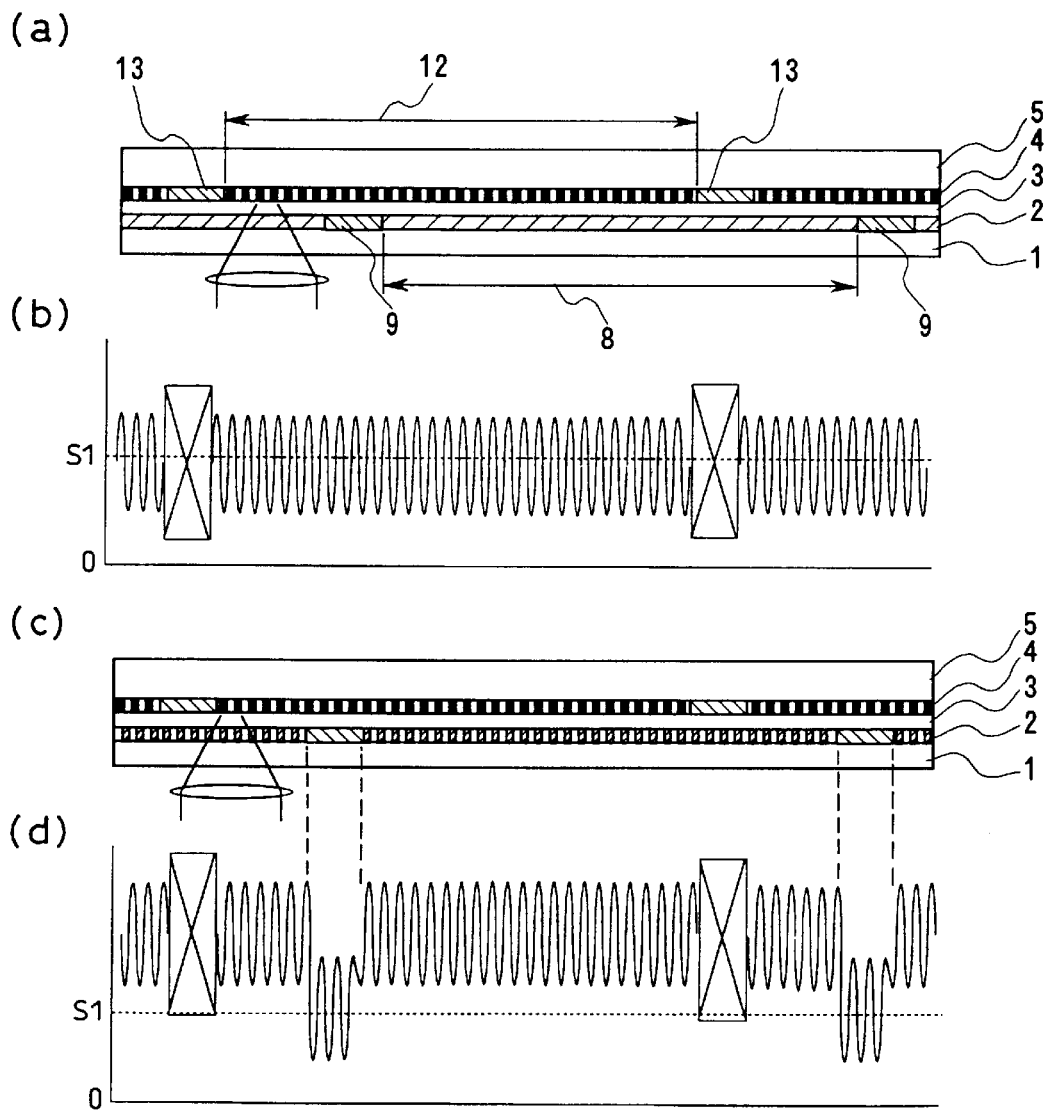
FIG. 9 is a schematic view showing an example of a conventional optical information recording medium and a waveform chart of reproduced signals.

As shown in FIG. 9, in a conventional optical recording medium, the level of signals reproduced from a second information layer varies depending on whether a first information layer is recorded or not recorded. On the other hand, as shown in FIG. 2, the present invention can suppress the amplitude fluctuation in a sector.

However, when light beams are focused on the second information layer, the light beams through the first information layer depend mainly on the thickness of a separating layer and the NA of an object lens. In the case where the NA of an object lens is 0.5 to 0.6 and the thickness of a separating layer is 20 to 100 $\mu$m, the amount of light that reaches the second information layer is affected by the area in the vicinity of a light-focused portion, ranging from about 20 to 100 $\mu$m in diameter. In other words, the amount of light that reaches the second information layer varies depending on the recorded state of the first information layer in this area. Therefore, errors are caused in a recording power suitable for the second information layer, when viewed from the pickup side.

On the other hand, in this embodiment, the second and the following information layers are recorded after the entire surface of the first information layer has been recorded during the manufacturing or recording of a recording medium.

First, the recording of information layers during manufacturing a recording medium will be described. In a recording medium formed by the method that has been described in Embodiments 1 and 2, signals having a predetermined pattern are recorded on the entire data area of the first information layer. Examples of such signals include those having a pattern of modulation that is the same as data information, a pattern of a specified single period, or a pattern of repetition of specified signals. There is no particular limitation to the pattern of signals, as long as the average transmissivity of the first information layer in the above area ranging from 20 to 100 μm in diameter is equal to the transmissivity of the first information layer when data information is recorded on the entire area thereof.

Furthermore, there is a method in which the recording of a predetermined pattern also serves for the recording to manage faults in an optical recording medium. In other words, a predetermined recording pattern is used as an information pattern including a code for correcting errors. Information in accordance with this pattern is recorded on the user's area in an optical recording medium. Then, a defective sector can be identified by detecting demodulation errors during reproduction. In addition, the fault-management includes allocating an area to be substituted for the defective sector.

The alternate sector may be provided in the inner or outer circumference of the data area or in the last region of each zone, depending on the format of an optical recording medium. In this embodiment, besides the operation of fault-management, signals are recorded on an area to be substituted for the area where recording is inadequate. Furthermore, when a test recording area or the like is provided in the inner or outer circumference of the information layer other than the user's area, signals are also recorded on that area. For a two-layer optical disk, the entire surface of the first information layer is recorded. However, the same effect can be obtained by a multilayer recording medium in which all the information layers except at least the most distant information layer from light beams are recorded.

When the above process is performed during manufacturing a recording medium, signals can be recorded on any position of any information layer at the time of installation of a recording medium of the present invention in an optical disk apparatus.

On the other hand, the user's area is not recorded during manufacturing, which reduces the production cost of a recording medium. Instead, the user's area can be recorded by an optical disk apparatus.

There are two methods for this. The first method is such that the entire surface of the first information layer is recorded when a recording medium is first installed in an optical disk apparatus. This method can provide the same effect as that described above. Though the initial recording may cause a loss of time, it can be reduced in the subsequent operations.

The second method is such that the order of information recording on a recording medium is determined. In other words, the recording is performed sequentially from the first track of the first information layer, and then the second information layer is recorded after the entire surface of the first information layer has been recorded completely.

In this case, it is necessary that signals be recorded completely on the entire recording area, including an alternate sector, a test area, or the like when the recording of the entire surface of the user's area is completed. These areas may be recorded in installation of a recording medium in an optical disk apparatus, in completion of the predetermined recording, or in completion of the recording of the user's area of the first information layer.

Furthermore, when the information layer to be recorded is the most distant information layer, i.e., in the case of a two-layer disk, it is a second information layer, signals can be recorded on any position of the second information layer.

The first and the second method described above may be selected in accordance with the type of data to be recorded by users. The first method is used for the recording of data information that requires a relatively small data capacity and a large number of files. The second method is suitable for the recording of continuous signals that require a large capacity for a file, such as video signals.

Each of the above embodiments allows a sectored optical recording medium having a plurality of information layers to be recorded and reproduced stably.

The above embodiments have been described individually. However, it is obvious that a combination of the processes of the respective embodiments can provide more stable recording/reproducing operations.

INDUSTRIAL APPLICABILITY

As described above, the present invention can prevent errors during reproduction caused by the effect of other information layers and stabilize recording characteristics in such a manner that the sector positions in a plurality of information layers coincide. In addition, those information layers are recorded sequentially from the information layer on the laser beam incident side, allowing for more stable recording/reproducing operations.

Thus, the present invention can be applied to a rewritable recording medium having a plurality of information layers with a sector structure and can increase the recording capacity of a recordable optical disk.

What is claimed is:

1. An optical information recording medium comprising a substrate and at least two information layers formed on the substrate, the information layer formed of a thin film that shows a change that can be detected optically by light beam irradiation, wherein a separating layer that is transparent to a wavelength of the light beams is formed between the information layers, each information layer has a sector structure including a sector address and a data area that are divided in a circumferential direction, each information layer has the same number of sector addresses in the circumferential direction, and positions of the sector addresses of the respective information layers coincide in the circumferential direction, wherein an amount of dislocation between the sector addresses of the respective information layers in a circumferential direction is smaller than a sum of a length of a gap between the sector address and the data area and a length of a guard data in the data area.

2. An optical information recording medium comprising a substrate and at least two information layers formed on the substrate, the information layer formed of a thin film that shows a change that can be detected optically by light beam irradiation wherein a separating layer that is transparent to a wavelength of the light beams is formed between the information layers, each information layer has a sector structure including a sector address and a data area that are divided in a circumferential direction, each information layer has the same number of sector addresses in the circumferential direction, and positions of the sector addresses of the respective information layers coincide in the circumferential direction.

wherein each information layer further comprises a management area, and a sector position identifier for identifying the position of a sector is located in an area other than the data area, the sector address, and the management area of each information layer so as to have a certain relationship to the sector address of each information layer in a circumferential direction wherein the sector position identifier is arranged in proximity to the management area at an inner circumferential region thereof, and a shape of the sector position identifier formed on the information layer closest to the substrate is different from a shape of the sector position identifier formed on the other information layers.

3. An optical information recording medium comprising a substrate and at least two information layer formed on the substrate, information layer formed of a thin film that shows a change that can be detected optically by light beam irradiation, wherein a separating layer that is transparent to a wavelength of the light beams is formed between the information layers, each information layer has a sector structure including a sector address and a data area that are divided in a circumferential direction, each information layer has the same number of sector addresses in the circumferential direction, positions of the sector addresses of the respective information layers coincide in the circumferential direction, a second substrate having a sector structure including a sector address and a data area that are divided in a circumferential direction, a first information layer is formed on the first substrate and a second information layer opposed to the first information layer is formed on the second substrate, and a position of the sector address of the first substrate and a position of the sector address of the second substrate coincide in the circumferential direction, wherein each of the first and the second substrate further comprises a management area, and a sector position identifier for identifying the position of a sector is located in an area other than the data area the sector address, and the management area of each of the first and the second substrate so as to have a certain relationship to the sector address of each of the substrates in a circumferential direction, wherein the sector position identifier is arranged in proximity to the management area at an inner circumferential region thereof, and a shape of the sector position identifier formed on the first substrate is different from a shape of the sector position identifier formed on the second substrate.

* * * * *

UNITED STATES PATENT AND TRADEMARK OFFICE
CERTIFICATE OF CORRECTION

PATENT NO.     : 6,795,389 B1                                                Page 1 of 1
DATED          : September 21, 2004
INVENTOR(S)    : Nishiuchi et al.

It is certified that error appears in the above-identified patent and that said Letters Patent is hereby corrected as shown below:

Title page,
Item [54], Title, "OPTICAL INFORMATION RECORDING MEDIUM WITH SUBSTRATE AND MULTIPLE INFORMATION" should read -- OPTICAL INFORMATION RECORDING MEDIUM WITH SUBSTRATE AND MULTIPLE INFORMATION LAYERS --.

Column 19,
Line 3, "irradiation" should read -- irradiation, --.
Line 14, "direction." should read -- direction, --.
Line 21, "direction" should read -- direction, --.
Line 29, "layer" should read -- layers --.
Line 30, "substrate, information" should read -- substrate, the information --.

Column 20,
Line 23, "data area" should read -- data area, --.

Signed and Sealed this

Twenty-seventh Day of September, 2005

JON W. DUDAS
*Director of the United States Patent and Trademark Office*